United States Patent [19]

Barta

[11] 4,211,810
[45] Jul. 8, 1980

[54] SELF-ADHERING, TRANSFERABLE LAYER OF VARNISH (LACQUER) OR COLOR

[75] Inventor: Franz Barta, Vienna, Austria

[73] Assignee: BSB Aktiengesellschaft fur Mechanische Beschriftung und Dekoration, Basel, Switzerland

[21] Appl. No.: 961,910

[22] Filed: Nov. 20, 1978

Related U.S. Application Data

[62] Division of Ser. No. 730,508, Oct. 7, 1976, abandoned.

[30] Foreign Application Priority Data

Oct. 7, 1975 [AT] Austria ................................ 7658/75

[51] Int. Cl.² .......................... B41M 3/12; B05D 3/02
[52] U.S. Cl. ................................... 428/201; 427/146;
427/152; 427/393.5; 427/385.5; 156/240;
428/914

[58] Field of Search ................... 427/146, 152, 385 R,
427/385 B; 156/240, 234; 428/201, 195, 202,
204, 211, 227, 199, 352, 353, 480, 487, 483

[56] References Cited

U.S. PATENT DOCUMENTS

| 3,014,828 | 12/1961 | Reese | 156/240 |
|---|---|---|---|
| 3,516,842 | 6/1970 | Klinker et al. | 428/914 X |
| 3,770,479 | 11/1973 | Dunning | 427/152 X |
| 3,799,829 | 3/1974 | Heatwole | 156/234 |
| 3,985,602 | 10/1976 | Stuart | 428/914 X |

Primary Examiner—George F. Lesmes
Assistant Examiner—R. Eugene Varndell, Jr.
Attorney, Agent, or Firm—Sughrue, Rothwell, Mion, Zinn and Macpeak

[57] ABSTRACT

A self-adhering transfer material including one or more transferable design layers, a lower adhesive layer and an intermediate layer of a polyester resin hardenable into a form-stable layer to act as a stabilizing and blocking layer.

11 Claims, 1 Drawing Figure

U.S. Patent                Jul. 8, 1980                4,211,810
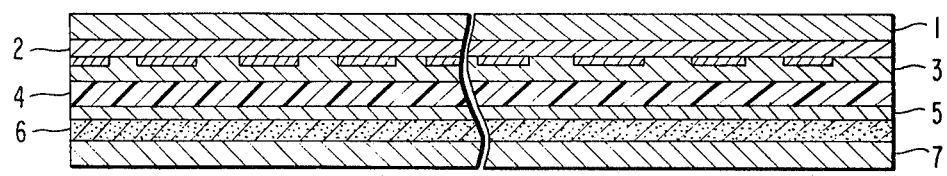

SELF-ADHERING, TRANSFERABLE LAYER OF VARNISH (LACQUER) OR COLOR

This is a division of application Ser. No. 730,508, filed Oct. 7, 1976, now abandoned.

The invention relates to a self-adhering, transferable layer of varnish or color, like a self-adhering transfer picture or a self-adhering foil, with a lower adhesive partial layer which is connected by way of an intermediate layer with the (real) partial layer of varnish or color. Furthermore, the invention relates to a process for the production of such a self-adhering transferable layer of varnish or color.

Self-adhering transferable layers of varnish and color are produced above all as self-adhering foils and tapes or as dry or wet, detachable self-adhering transfer pictures; they serve for lettering on means of communications, machines, devices etc., as warning signs, traffic signs etc., and are applied to the most diverse backgrounds such as varnished wood, glass, varnished and unvarnished metals, plastics, etc., While self-adhering foils obtain their desired outside shape by blanks or punching out, transfer pictures will obtain their required size and outside shape during the production in various printing processes, preferably by way of the screen printing. The essential difference in the production lies in the fact, that foils are produced mostly in wide webs by casting, blowing or extruding and that many methods can be used in that case, such as the effect of temperature, stretching and calandering, as a result of which a mostly sufficient stability can be achieved. In case of the production of self-adhering transfer pictures however only such substances can be used which can be processed in the various printing processes, whereby especially the screen printing process is used for the formation of film. A transfer picture itself must be printed onto a carrier or carrier foil, f. ex. onto a transfer picture paper, onto wax coated paper or on polyethylene sealed paper. The drying of the varnishes and colors however must take place in the physical way by evaporating the solvents, since the use of such high temperatures as customary in the production of foils, is not possible.

Among the transfer pictures per se there are many kinds which can be applied in a weather resistant, form-stable manner on various surfaces, but various secondary measures are necessary for this, such as f. ex. prime coating of hardenable adhesive or solvents for the activation of the picture film (f. ex. German OS 2 121 083), which have the disadvantage that for each background one must select the matching adhesive process since it is conditional on a big difference whether or not the transfer picture is transferred on glass, plastic or a varnished or unvarnished metal. The universal use of the same picture on the most different backgrounds is often not possible because of this.

Self-adhering transfer pictures as well as self-adhering foils overcome these difficulties, since the permanently adhering layers will adhere on almost all backgrounds solidly and permanently.

In practice however and particularly in the case of self-adhering transfer pictures, it has turned out that conditional on atmospheric influences such as heat, cold, fog, rain, UV light etc., great changes in dimensions occur. This, after a short time, leads to a strong shrinking of the picture film which wrinkles as a further consequence, cracks or tears.

The use of self-hardening permanent adhesives does not produce any satisfactory remedy, since on the one hand the picture film is difficult to transfer even after a relatively short storage and on the other hand despite the selfhardening of the adhesive, formations of cracks do occur.

From the German OS 2 347 138 a transfer material had become known which is used particularly for the production of letterings and in case of which the individual printing ink-drawing elements, which are located on a carrier sheet, are surrounded by an adhesive or are coated with such an adhesive. In order to impart a higher mechanical strength in that case to the drawing elements consisting of printing ink, supporting films made of an epoxy polymer have been provided in the area of the individual drawing elements which together with the drawing elements are surrounded by the adhesive. This arrangement among others has the great disadvantage that the epoxy supporting film after its application, must be allowed to stand for a fairly long time. f. ex. 12 hours until a tough, solid film is available, after which it will be possible only to apply the layer of adhesive.

During the transfer of self-adhering, transferable layers of varnish or color, reactions between the permanently adhering layer, which indeed may consist of the most varied pressure sensitive adhesives, i.e., above all of soft resins, and the background is not to be excluded, are indeed in many cases even desired for a better, thorough tempering. The reaction between the adhesive and the background at the same time can still be particularly accelerated by irrediation of the sun respectively the UV portion in the light. As a result of that above all in the case of plastics, diffusions of components of the background can enter into the adhesive which then changes. Whenever now these changed chemical substances penetrate into the actual layer of color, i.e. into the picture film, then phenomena of destruction may occur such as perhaps a total softening and stickiness, development of blisters, fissures and cracks, discoloration by the background. It is possible f. ex. that a white surface becomes pink whenever a red varnish background adheres by dissolution and discolors all layers lying above it.

In the German OS 2 327 386 furthermore a type of hot press transfer foil has been described in the case of which between the layer of the varnish or the picture and a bipartite layer of adhesive, an intermediate layer of a vacuum deposited metal has possibly been provided. This exceedingly thin steamed-on intermediate metal layer only has an optical effect, but it does not prevent the above mentioned disadvantageous phenomena, such as shrinking, formation of cracks, softening, discoloration, etc.

Therefore, it is the task of the present invention to find a remedy here and especially to make possible a stability of form or dimensions of the transferable, self-adhering layer of varnish or color even in the case of extreme climatic loads for years without shrinking, tearing, etc., whereby also a penetration of chemical substances from the background to the actual layer of varnish or color should be avoided effectively.

The transferable layer of varnish or color according to the invention has been characterized in that a form-stable intermediate layer made of polyester resin has been provided; moreover, preferably the adhesive partial layer has been connected with adhesive strength with the polyester resin by way of a primer layer or an adhesion promoting layer.

As a result of the form-stable polyester resin intermediate layer which has an excellent blocking effect, the disadvantageous influence of the adhesive on the film of color as well as a penetration of chemical substances to the layer of color is prevented and the stability of form of the self-adhering transfer picture, etc. is guaranteed even for example in the case of extreme outside temperatures. For example, the polyester resin is colorless and is connected on the one hand with the pre-printed customary colors and varnishes of transfer pictures, but it permits surprisingly also a good anchoring of the adhesive partial layer; moreover it can be processed under normal conditions as they are customary on screen printing machines, whereby the production process can be considerably shortened in comparison to the one hitherto. Preferably the polyester resin as far as the intermediate layer is concerned, does not have a yellowing effect and is permanently elastic.

Effectively the polyester resin forming the form-stable intermediate layer is pigmented and is in the geometric outside shape congruent with the primer layer and the partial layer of the adhesive. As a result of that a simplification in the structure of the partial layer of varnish or color is made possible since the intermediate layer itself forms a color base or a partial layer of color.

It will be advantageous whenever in the polyester resin forming the form-stable intermediate layer, crystalline, non-soluble bodies are contained for the anchoring of the partial layer of adhesive.

The process according to the invention for the production of a self-adhering transferable layer of varnish or color according to the invention is characterized in that a hardenable mass of polyester is applied on the underside of the partial layer of varnish or color as the form-stable intermediate layer and that on this and still before its complete hardening respectively drying out and possibly with interposition of the layer of primer or adhesion promotor, the mass for the adhesive partial layer is applied.

For the anchoring of the adhesive partial layer on the not yet hardened polyester resin intermediate layer a nitro-combination varnish, a screen printing varnish known per se or an acrylic resin varnish is applied as a primer layer and especially it is printed on, and on said layer the adhesive is applied.

For the adjustment of the varnish system required for the printing of the form-stable polyester resin intermediate layer serving as a blocking layer and as a stabilizing layer, the drying time is of importance. Prepolymerization, time of maturing, pot time and drying time must be synchronized such according to the prevailing temperature and atmospheric moisture, that a large scale hardening would indeed be achieved for the succeeding layer (layers) however a sufficient possibliity of anchoring would still be offered. It was found that in the case of the use of polyesters for the intermediate layer, a maturing time of 30 minutes at ambient temperature (21° C.) and at a relative atmospheric humidity of 60% with a running speed of 500 m per hour will result in optical conditions for the succeeding primer print.

The recipe, the components of the solvent, the thickness of application and the drying of the primer must be synchronized in such a way to the previously applied intermediate layer that the pulling up or deformation of the layers will be prevented.

A stabilizing intermediate layer, layer of a primer and a layer of an adhesive on the one hand and the already previously printed layers on the other hand form a closed unit in order to be able in that way to withstand the influences of the weather. In the present case, the adhesive must be synchronized on the basis of acrylic or vinyl ether resins in such a way, that it will enter on the one hand into good condition with the primer and on the other hand make possible a certain hardening effect after the transfer.

In the case of transfer pictures the layer of varnish normally has a somewhat larger surface than the visible form; therefore, the outside contours both of the first printed varnishes as well as the form-stable intermediate layer, of the primer layer and of the adhesive partial layer lie as precisely as possible one on top of the other. Whenever the intermediate layer is larger as far as the surface is concerned, then the remaining layers of varnishes splitting in the case of the dry transferable paper on the projecting edge is impossible. In the case of small layers of varnish not lying precisely on top of each other a standing up of the edges of the margin not covered by the intermediate layer may occur which then constitutes a point of attack for the atmospheric influences and which could lead to a destruction of the pictures from the direction of the edge.

Naturally, the adhesive and the polyester resin provided for the intermediate layer are to synchronized with one another in such a way, that the adhesive which must retain its capacity of self-adhering for years, is not impeded by reaction with the polyester resin, since otherwise the so-called "deadening" occurs which leads to the transfer pictures becoming unusable after prolonged storage.

According to the invention it is also of particular advantage whenever for the anchoring of the adhesive partial layer during the hardening time a powdery adhesion promoter is dusted onto said polyester mass forming the form-stable intermediate layer, and after that the adhesive is applied.

Furthermore, it will be advantageous whenever non-soluble crystalline particles are admixed to the polyester mass for the form-stable intermediate layer which are not soluble in said layer and which upon drying or hardening of the polyester mass of the form-stable intermediate layer rise to the underside which during the production lies uppermost of said intermediate layer and anchor the partial layer of the adhesive.

Advantageously, first of all 156 parts by weight of 65% polyester in ethylglycol acetate, 135 parts by weight of 75% polyoxy compound in xylene, 6 parts by weight of a 10% solution of a cellulose acetobutyrate in ethylacetate and 0.1% calculated on the content of solid substance, of a silicone oil can be mixed for the production of the form-stable intermediate layer and can then be mixed homogenously with a mixture consisting of 195 parts by weight of 75% aliphatic isocyanate in ethylglycol/xylene and 7 parts by weight of a 10% zinc octoate solution, while stirring carefully; the mixture obtained thus is then brought to processing viscosity with the proper solvents.

The invention will be explained in more detail subsequently on the basis of a drawing as well as an example without however being limited thereto.

DESCRIPTION OF THE DRAWING

The FIGURE of the drawing is a sectional view of the embodiment of the present invention.

In the drawing a structure of a transfer picture has been illustrated schematically in cross section but not in the true scale. At the same time on top lies a traditional transfer picture paper 1 as the carrier or foil; below it lie the actual color layers which altogether are designated by the reference number 3 possibly with an opaque undercoat, whereby between these color layers 3 and the carrier 1, a separating layer 2 has been provided in order to facilitate a separation of the picture from the carrier foil 1, say in the case of gluing on a backing. For the separating layer 2, a customary transparent screen printing varnish can be used; the number of the color layers of the partial layer 3 of varnish or color of the entire surface is governed by the picture motive and likewise whether or not an opaque undercoat is required and known screen printing color or varnishes, drying by evaporation of the solvent, can be used for this.

Below the cover layer 3, there is the polyester resin intermediate layer 4, provided as a blocking layer or for the stabilization of the picture, which is firmly connected with the color layer 3 and carries an adhesive coating or a partial layer 6 of adhesive. For a particularly good anchoring of the adhesive on the intermediate layer 4, an adhesive promotor can be dusted on during the production; also crystalline particles can be provided for this purpose in the intermediate layer 4.

In the case of the present embodiment, a primer layer 5 has been provided for the anchoring of the adhesive between the intermediate layer 4 by the adhesive layer 6 for which the screen printing varnish, a nitro-combination varnish or an acrylic resin varnish, used alrady for the separating layer 2, may be used.

The layer 6 of adhesive is finally covered up by a silicon paper layer 7, which is removed prior to gluing on of the transfer picture.

The transfer picture may be glued onto the most different background materials, such as wood, glass, varnished or unvarnished metal, plastics, ceramics, f. ex. tiles etc. and even in the case of the most unfavorable circumstances will remain stable as to form and dimension and does not shrink or tear.

EXAMPLE

A self-adhering transferable layer with a structure as described before on the basis of the drawing, therefore with a separating layer, color layer, form-stable polyester resin intermediate layer, primer layer and layer of adhesive is produced as follows: The separating layer 2 made of a transparent screen printing varnish is applied to a traditional, known gummed transfer picture paper (f. ex. "meta paper" of the firm Hoffmann and Engelmann) by the screen printing process with a plastic fabric with 43 threads/cm. After airing the separating layer, the actual picture motive is applied. As colors, known physically drying screen printing colors are used. The number of color layers at the same time is governed by the picture motive and whether or not an opaque cover layer is required. The fineness of the synthetic fabric used for the screen printing varies and is likewise governed by the motive.

After that the application of the polyester resin intermediate layer 4 is accomplished with a synthetic fabric with 43 threads/cm. The polyester mass for the intermediate layer is prepared as follows:

Component A 156 parts by weight of 65% polyester in ethylglycol acetate, 135 parts by weight of a 75% polyoxy compound in xylene, 6 parts by weight of a 10% solution of cellulose acetobutyrate in ethylacetate and 0.1%, calculated on the content of solid substance, of silicon oil are mixed carefully and are worked through;

Component B 7 parts by weight of a 10% zinc octoate solution are inserted in 195 parts by weight of 75% aliphatic isocyanate in ethylglycol/xylene and are distributed homogenously while stirring carefully.

The components A and B are mixed subsequently and are brought to a processing viscosity with the proper solvents.

Whenever the intermediate layer has not yet been completely hardened or dried out, the application of the primer layer 5 takes place with a synthetic fabric with 77 threads/cm. A nitro-combination varnish, an acrylic resin varnish and a screen printing varnish, as used for the separating layer, are used as material for this purpose.

Finally the layer of adhesive is applied for which a synthetic fabric with 29 threads/cm is used.

The transfer picture obtained thus is form-stable, it will practically not shrink and tear, not even under the most unfavorable circumstances.

The form stability can be tested with various devices f. ex. with a "weatherometer". A short test by means of a heat shock can also be carried out in the case of which a self-adhering transfer picture of the size of 10×10 cm is applied to a polished aluminum sheet. The picture is allowed to rest for 24 hours at ambient temperature, then a cross cut through the middle of the picture is made with a razor blade and finally the picture is heated at 70° C. for 8 hours is a drier. The cross cut may swell a maximum of 0.2 mm, the outside form of the picture must remain unchanged. Various test regulations in the aircraft and railroad car industries, agricultural machinery industry etc. supply additional test conditions, such as f. ex. resistivity against chemical cleaning agents, lyes and acids, resistance to abrasive hardness, resistivity against cleaning with high pressure water jets (30 atü angle of impact of the water jet 45°).

Additional stresses (requirements) are alternating temperatures, whereby customarily 7 cycles at 24 hours are prescribed (8 hours −70° C., 16 hours +74° C.).

The abrasion resistance can be tested by means of "taber abraser".

The adhesive force of the adhesive is measured as follows:
wedge tester Dow Corning No. 2
width of strip 25 mm
angle of pull 180°
pulling off speed 30 cm/minute.

The test strips are put on non-rusting, smoothly polished V2A steel and are pressed on evenly four times with a rubber roller weighing 1000 g. After a testing period of 12 hours, the strip is pulled off. The force which is required for this (data in g) is evaluated.

The pull off values may drop only by about 20% of the original value after one year of storage and then they must remain unchanged in the further period.

It turned out that the self-adhering transfer layer of varnish or color according to the invention corresponded best to the above requirements.

I claim:

1. A process for the production of a self-adhering transfer material comprising in descending order an upper foil-like or paper-like carrier layer, one or more transferable design layers which are releasably connected to the carrier layer and a lower adhesive layer, which process comprises applying an intermediate layer consisting essentially of a polyester resin hardenable to a permanently elastic form-stable layer, said polyester layer being adhesively bondable and compatible with both the adhesive layer and the one or more design layers, said polyester layer applied in a hardenable state to the underside of the one or more transferable design layers and prior to the complete hardening or drying out of said intermediate layer, applying the adhesive layer to the intermediate layer.

2. The process of claim 1, wherein particles which are not soluble in the polyester resin but are capable of rising in the polyester resin as the polyester resin hardens or dries are added to the polyester resin forming said form-stable intermediate layer for the anchoring of the adhesive layer to said intermediate layer.

3. A self-adhering transfer material produced by the process of claim 1.

4. The process as in claim 1, wherein a mixture of 156 parts by weight of 65% polyester in ethylglycol acetate, 135 parts by weight of a 75% polyoxy compound in xylene, 6 parts by weight of a 10% solution of a cellulose acetobutyrate in ethyl acetate and 0.1%, calculated on the contents of solid substance of a silicone oil on the one hand, with 195 parts by weight of 75% aliphatic isocyanate in ethylglycol/xylene and 7 parts by weight of a 10% zincoctoate solution on the other hand, brought to processing viscosity with the proper solvents, is applied as a polyester mass for said form-stable intermediate layer.

5. A self-adhering transfer material produced by the process of claim 4.

6. The process of claim 1, wherein a primer layer is applied between said intermediate layer and said adhesive layer.

7. The process of claim 6, wherein said primer is a nitro-combination varnish, a screen printing varnish or an acrylic resin varnish.

8. The process of claim 6, wherein said intermediate layer is pigmented and is applied to have the same outside dimensions as said primer layer and as said adhesive layer.

9. The process of claim 1, wherein an adhesion-promoting agent is used to increase the adhesion between said intermediate layer and said adhesive layer.

10. The process of claim 9, wherein said promoting agent is a powdery adhesion promoter.

11. The process of claim 10, wherein said powdery adhesion promoter is dusted onto the intermediate layer and then the adhesive is applied.

* * * * *